Patented July 8, 1930

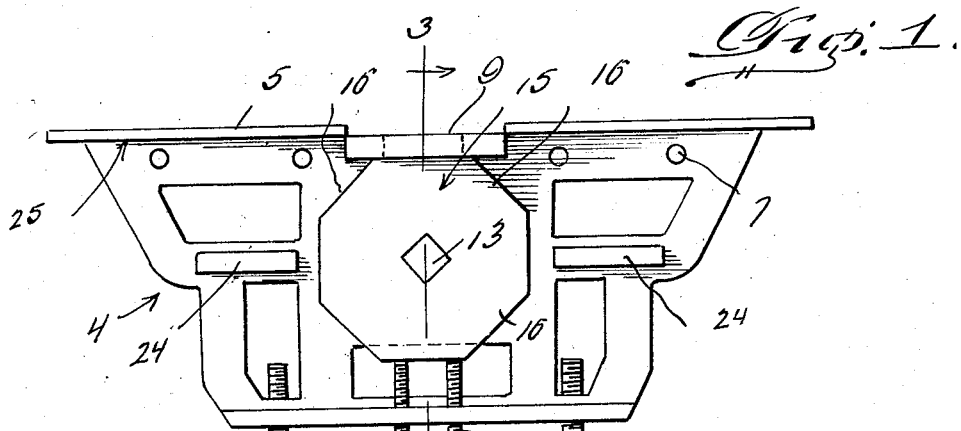
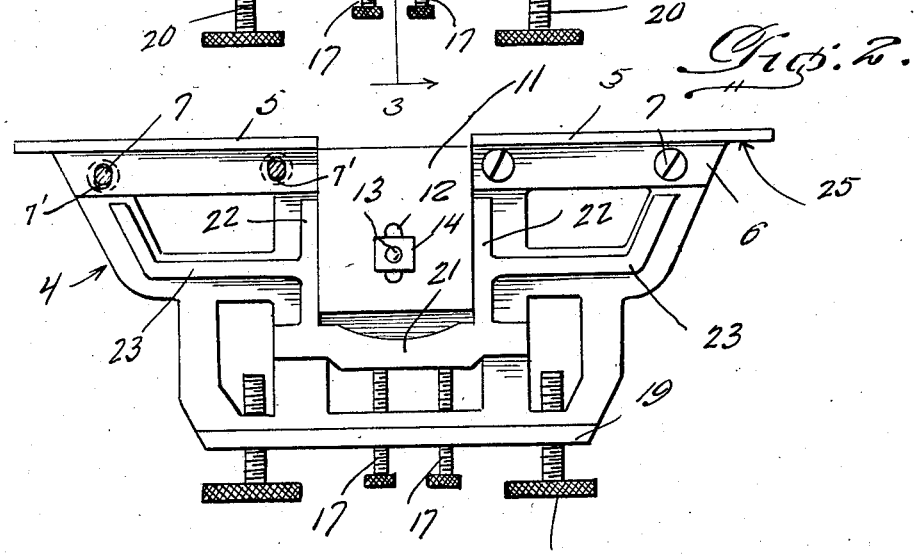
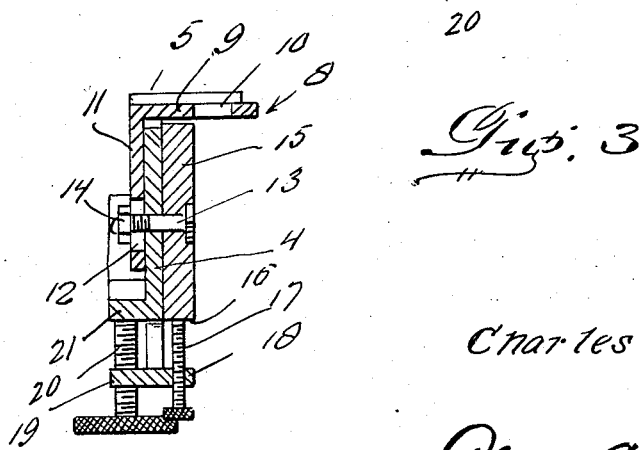

1,770,324

UNITED STATES PATENT OFFICE

CHARLES ROSS, OF SANDS, MICHIGAN, ASSIGNOR, BY MESNE ASSIGNMENTS, OF ONE-HALF TO GEORGE E. KOSKI, OF GWINN, MICHIGAN

SAW-TOOTH GAUGE

Application filed September 1, 1927. Serial No. 216,920.

This invention relates to an improved saw tooth gauge and device which is to be used in connection with the filing of cross-cut saws.

Briefly, the invention has reference to a device of this class which includes, among other parts, a body member which carries a pair of longitudinally spaced cutting teeth plates, these being adjustably mounted and disposed in a position to accommodate an independently adjustable raker tooth plate. Associated with the raker tooth plate is an adjustable dial gauge and retaining member having a variable bearing surface for regulating and maintaining the position of the raker tooth plate.

My principal aim is to generally improve upon devices of this class by providing one which is characterized by such indispensable features as accuracy and dependability, strength and durability, simplicity in construction and low cost in production and sale.

The structural features which herein cooperate to render this device distinctive and individual will become more readily apparent from the following description and drawings.

In the drawings:—

Figure 1 is a view of a gauge constructed with the invention observing one side of the same.

Figure 2 is a similar view looking at the opposite side.

Figure 3 is a central vertical section taken approximately upon the plane of the line 3—3 of Figure 1 looking in the direction of the arrows.

Before proceeding with the detailed description I first desire to mention briefly that the usual cross cut saws are provided with what are known as cutting teeth and raker teeth.

The purpose of the cutting teeth is to cut the timber, while the function of the raker teeth is to extract the saw dust from the cut to facilitate movement of the saw blade. The raker teeth are cut slightly lower than the cutting teeth. Variation, however, in the height in the cutting and raker teeth is usually very slight. For example, in work of this kind hard wood requires a certain height, and soft wood requires a different height. It follows also that the height of the raker teeth adjusted for cutting frozen timber will vary from the height of the same kind of teeth for cutting the same kind of timber when it is not frozen.

The main difficulty and trouble with the gauges now on the market is that it is clearly difficult to adjust the raker plate of the gauge at the proper level. The raker plate now in use is provided with a single retaining screw and the plate frequently gets out of alinement, this makes it necessary for a filer to go over the saw twice in order to get the raker teeth all at the same length or height. Usually he files once for the raker gauge set and then reverses it and goes back over the saw. Naturally, this consumes time and is not reliable. Bearing in mind these difficulties I have attempted to produce an improved structure which embodies a body member 4 of suitable configuration. The body here shown is of substantially flat plate-like form being provided with a series of openings to reduce weight. The upper edge of the body is straight and so constructed as to accommodate a pair of cutting teeth plates 5 of duplicate construction. Each plate comprises a horizontal portion carrying a depending flange 6 adjustably fastened to the body through the medium of screws 7 (see Figure 2). The inner ends of these two plates are spaced apart a distance to accommodate the raker plate 8. This plate is better shown in Figure 3 and comprises a horizontal top portion 9 having a rectangular opening 10 formed therein and a depending leg portion 11 slidably contacting one side of the central portion of the body 4. The opening 10 in the raker plate 8 is adapted to have the raker teeth of the saw projected upwardly therethrough until the cutting teeth of said saw engage against the lower side of the plate 5 and thereafter the portions of the raker teeth which protrude above the horizontal plane of the upper face of the plate 8 are filed off flush with the upper face thereof and in this manner, evenness in length of all of the raker teeth is assured. Incidentally this portion 11 has an elongated slot 12 formed therein and a bolt 13 passes through the body member and through the slot and carries a retaining nut 14. This same bolt serves to hold in place, on the opposite side of the body a rotary dial 15. This dial as shown in Figure 1 is of general octagonal configuration. Thus I provide a series of individual bearing surfaces 16 around the peripheral portion of the dial. These surfaces are intended to be turned beneath the overhanging horizontal portion of the raker plate 8 so as to provide a gauge for said plate.

The perpendicular distance from the axis of rotation of the dial to the various bearing surfaces 16 varies gradually and in a successive manner. In other words one surface is a certain distance from the axis of rotation, and the next successive surface is dropped 1/256 of an inch lower. The next surface is dropped a corresponding distance, and so on around the periphery. Closely associated with the gauge we find a pair of set screws 17 which are brought up into firm contact with the adjacent edge of the dial after the dial has been set at the desired point. In connection with the set screws it will be noted that they are mounted on an outstanding flange 18 formed on one side of the body member at the bottom. There is also a similar flange 19 formed on the opposite side, and this carries a pair of jointer screws 20. The jointer screws 20 cooperate with a jointer plate 21 formed on the side of the body member shown in Figure 2 and to accomplish this a conventional file, (not shown) is clamped against the face of the jointer plate 21, through the medium of the screws 20, after which the cutting teeth of the saw are moved over the surface of the file, for the purpose of filing all of said teeth to a uniform length. At this time attention may be invited to the vertical spaced parallel ribs 22 on this side of the plate which are spaced apart to provide a guide for the depending leg 11 of the raker plate 8. Also additional ribs 23 branch out from the guide ribs 22 and provide abutments to bear against the side of the saw blade to aid in holding the device in place. On the opposite side of the plate as shown in Figure 1 we find similar bearing abutments 24.

In using this invention it is understood that when fixing the saw one must start out with the top of the raker plate on a dead level with the lower surface of the two tooth plates 5. In this connection these surfaces are designated by the reference character 25, and the position of the raker plates with respect to the surfaces is shown in both Figures 1 and 2. Stated another way, the top surface of the portion 9 of the raker plate 8 must be in a plane with the bottom surface 25 of the two cutting teeth plates 5. In this connection it will be noted that the plates 5 are made adjustable through the medium of elongated openings 7', provided in the vertical portions thereof, through which headed screws 7 extend and said screws are threaded into the body member 4, and are adapted to clamp the plates 5 tightly thereagainst in adjusted position, so that any irregularity to this effect may be taken care of. To begin with all the teeth of the saw should be of the same length or height. The raker plate 8 is then dropped the proper distance and the raker teeth cut or filed to the desired length shorter than the cutting teeth, depending upon the kind of timber to be acted upon. The regulation of the raker plate is of course determined by the position of the dial and according to the bearing surface 16 which is then disposed in contact with the raker plate as shown in Figure 1. After the dial is set, the set screws are fastened to hold it in firm position. Also, the nut 14 is tightened and the device is ready for filing the raker teeth.

From the foregoing description and drawings it will be seen that I have developed a structure which is decidedly more accurate and dependable than those structures which have heretofore been employed for the same purpose. It is thought however, that persons familiar with inventions of this class will be able to understand the construction and operation as well as the improvements. Therefore, a more lengthly description is thought unnecessary.

Minor changes in shape, size, and rearrangement of parts coming within the field of invention claimed may be resorted to if desired.

Having thus described the invention, what I claim as new is:—

In a gauge of the class described, a body member, a cutting tooth plate adjustably mounted on said member, a raker tooth plate also adjustably mounted on said body member, a substantially octagonal gauge rotatably mounted on said body member and having its flat peripheral edges selectively positioned for contact with the under side of said raker plate, said surfaces being disposed at different perpendicular distances from the axis of rotation to permit the adjustment of the raker plate to be selectively varied, and there being a pair of set screws mounted on said body for cooperation with said gauge to aid in maintaining the latter in a set position.

In testimony whereof I affix my signature.

CHARLES ROSS.